United States Patent [19]

Diaz

[11] 4,240,769
[45] Dec. 23, 1980

[54] SOLID WASTE DISPOSING SYSTEM

[76] Inventor: Octavio Díaz, Margarita SG-11, Valle Hermoso, Hormigueros, P.R. 00660

[21] Appl. No.: 56,830

[22] Filed: Jul. 12, 1979

[51] Int. Cl.³ .................. B65G 51/00; B65G 53/40
[52] U.S. Cl. .............................. 406/108; 406/187; 406/190
[58] Field of Search ............... 406/108, 109, 110, 117, 406/147, 184, 187, 188, 189, 190, 198

[56] References Cited

U.S. PATENT DOCUMENTS

| | | | |
|---|---|---|---|
| 570,161 | 10/1896 | Fordyce | 406/15 |
| 3,606,478 | 9/1971 | Boon | 406/151 X |
| 3,612,438 | 10/1971 | Herndon | 406/190 |
| 3,949,953 | 4/1976 | Hopkins | 406/190 X |
| 4,084,769 | 4/1978 | Tyler | 406/108 |

FOREIGN PATENT DOCUMENTS 2248672  5/1973  Fed. Rep. of Germany .......... 406/117

*Primary Examiner*—James L. Rowland

[57] ABSTRACT

A system by means of which the garbage produced in a dwelling, or the like, is easily disposed remotely out of the dwelling from the inside. The garbage is deposited in a suitable bag located in the receiving end of a duct. Compressed air is applied at this receiving end of the duct, behind the bag. The compressed air enters the bag, expands it against the inner surface of the duct and pushes it with the garbage along the duct toward a garbage can located remotely at the end of the duct, outside of the dwelling.

1 Claim, 3 Drawing Figures

SOLID WASTE DISPOSING SYSTEM

SUMMARY

Existing inventions provide for conveying garbage produced inside a building remotely outside by means of compressed air pushing a bag full of garbage along a duct, said bag acting like piston. Since there are no means to assure that the bag will provide a suitable seal against the inner surface of the duct, some times the air escapes through a space left between the bag and said inner surface, thus ceasing to push the bag effectively. This invention is conceived to prevent this situation.

The invention consist of a duct with a receiving end located inside a dwelling, where the garbage is produced, and a discharge end terminating in a garbage can located remotely outside.

The garbage produced in the dwelling is placed in a bag suitably located inside the duct at its receiving end. The bag is suitably hung at the receiving end of the duct with its mouth open to receive the garbage. When the bag is full it is tied close. Then the receiving end of the duct is sealed by means of a suitable lid. Compressed air is then applied behind the bag. The compressed air enters the bag through a permeable portion of it at its trailing end, expands the bag against the inner surface of the duct and push it like a piston toward the discharge end of the duct.

DESCRIPTION

Complete details of the invention are given hereinbelow, in conjunction with the enclosed drawings in which.

Figure 1:
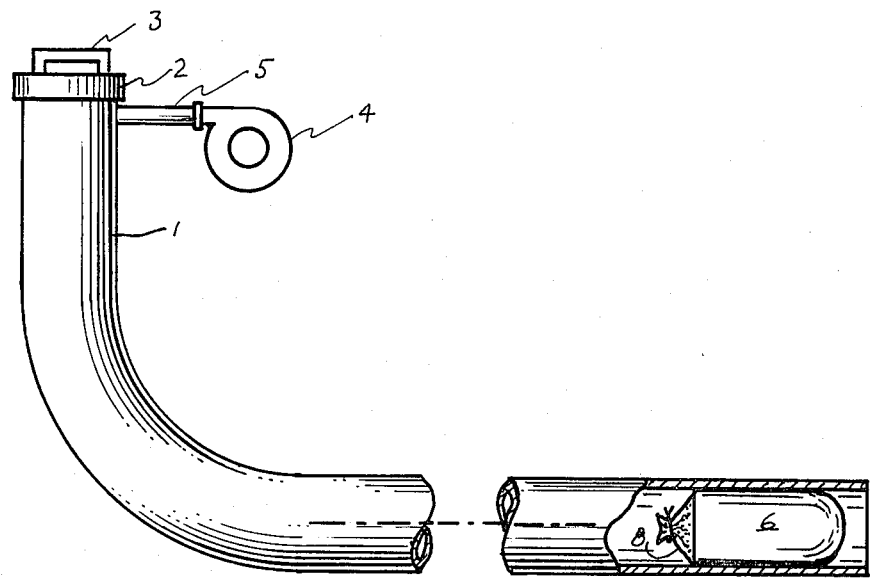
FIG. 1 is a side view partially in section of a solid waste disposing system embodying the invention.
Figure 2:
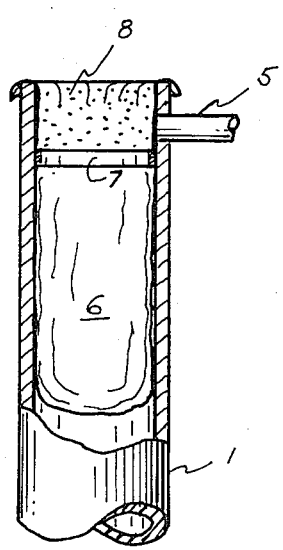
FIG. 2 is a side view partially in section of the receiving end of the duct showing the installation of the garbage bag in its standby position for loading with the duct lid removed.
Figure 3:
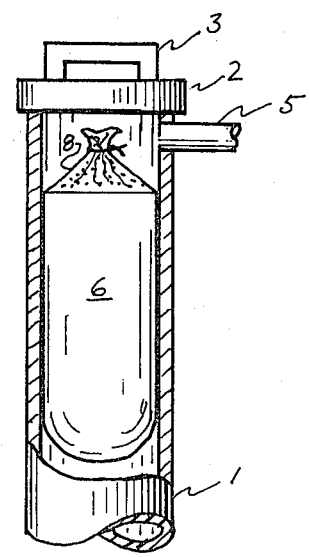
FIG. 3 is a side view partially in section of the duct receiving end showing the garbage bag closed and initiating its travel along the duct.

The duct 1 consists of a rigid pipe with a receiving end capable of being sealed closed by means of lid 2 and an open discharge end. The receiving end is suitably built to receive the flexible garbage bag 6 which is placed as shown in FIG. 2. The bag 6 is made of a suitable flexible material, like plastic or paper. It consists of a principal lower impermable portion for retaining the garbage, an upper permeable portion 8 which permits the air to flow inside the bag 6 when closed, and an annular spring 7 which provides an initial seal of the bag 6 against the inner surface of duct 1. The bag is suitably hung from the receiving end of duct 1 as it is loaded.

When the garbage bag 6 is full its open end is closed and tied and the receiving end of the duct 1 is closed with lid 2 which is suitably locked in the closed position. Then the blower 4 is started and compressed air is applied at the trailing end of the garbage bag 6 through air duct 5. The compressed air enters the bag 6 through the upper permeable portion 8 of bag 6, expands the bag against the inner surface of duct 1, thus providing a positive seal and pushes the bag along the duct 1 toward the discharge end of duct 1.

While this invention has been described with particular reference to the construction shown in these drawings and while various changes may be made in a detailed construction, it shall be understood that such changes shall be within the spirit and scope of the present invention as defined in the following claim.

I claim:

1. An improvement to pneumatic domestic type solid waste conveying systems comprising a rigid duct with a receiving end in which a flexible bag is placed to receive solid wastes, where said receiving end is capable of being closed and receiving compressed air to push said garbage bag along said duct toward the discharge end of said duct, where a positive seal of said bag against the inner surface of said duct is provided by means of an inner annular spring located inside said bag, and compressed air entering said bag through a permeable bag portion at its trailing end.

* * * * *